United States Patent [19]

Ball et al.

[11] 4,028,312
[45] June 7, 1977

[54] POLYURETHANES CROSSLINKED WITH OXAZOLINES

[75] Inventors: Clifford L. Ball; Harry A. Smith, both of Midland, Mich.

[73] Assignee: The Dow Chemical Company, Midland, Mich.

[22] Filed: May 24, 1976

[21] Appl. No.: 689,300

[52] U.S. Cl. .................. 260/77.5 AQ; 260/2.5 AQ; 260/75 NQ; 260/75 NP; 260/77.5 AM
[51] Int. Cl.² ........................................ C08G 18/06
[58] Field of Search ............ 260/2.5 AM, 2.5 AQ, 260/75 NP, 77.5 AM, 77.5 AQ, 77 NQ

[56] References Cited

UNITED STATES PATENTS

| | | | |
|---|---|---|---|
| 3,141,881 | 7/1964 | Katz | 260/2.5 AM |
| 3,221,016 | 11/1965 | Currier et al. | 260/2.5 AM |
| 3,365,426 | 1/1968 | Walles | 260/77.5 AQ |
| 3,432,475 | 3/1969 | McKillip et al. | 260/2.5 AM |
| 3,513,131 | 5/1970 | Marin et al. | 260/75 NP |
| 3,563,957 | 2/1971 | Beebe | 260/77.5 AM |
| 3,726,838 | 4/1973 | Eimer et al. | 260/75 NQ |
| 3,839,354 | 10/1974 | Habermeier et al. | 260/77.5 AM |

*Primary Examiner*—Eugene C. Rzucidlo
*Attorney, Agent, or Firm*—James G. Carter

[57] ABSTRACT

Oxazolines such as 2-(1,1-bis(hydroxymethyl)ethyl)-2-oxazoline have been found to be an effective crosslinker, curing agent or chain extender for polyurethanes.

8 Claims, No Drawings

POLYURETHANES CROSSLINKED WITH OXAZOLINES

The present invention concerns polyurethanes employing as the chain extender sometimes known as crosslinking agent or curing agent, certain oxazoline compounds and process for preparing such polyurethanes.

Since MOCA, methylene bis orthochloroaniline, has been placed on the suspected carcinogen list, efforts have been directed to discover suitable replacements for use in polyurethanes.

It has now been discovered that polyurethanes can be prepared employing, as the chain extender, an oxazoline represented by the formula

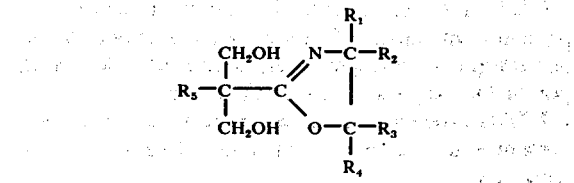

wherein each $R_1$, $R_2$, $R_3$, $R_4$ and $R_5$ are independently selected from hydrogen and hydrocarbon or halohydrocarbon radicals having from 1 to about 6 carbon atoms, preferably from about 1 to about 4 carbon atoms.

Suitable such curing agents include, for example,
2-(1,1-bis(hydroxymethyl)ethyl)-2-oxazoline,
2-(1,1-bis(hydroxymethyl)butyl)-2-oxazoline,
2-(1,1-bis(hydroxymethyl)propyl)-2-oxazoline,
2-(1,1-bis(hydroxymethyl)methyl)-2-oxazoline,
5-methyl-2-(1,1-bis(hydroxymethyl)ethyl)-2-oxazoline,
5-ethyl-2-(1,1-bis(hydroxymethyl)ethyl)-2-oxazoline,
5,5-dimethyl-2-(1,1-bis(hydroxymethyl)ethyl)-2-oxazoline,
5,5-diethyl-2-(1,1-bis(hydroxymethyl)ethyl)-2-oxazoline,
5-methyl-5-ethyl-2-(1,1-bis(hydroxymethyl)ethyl)-2-oxazoline,
2-(1,1-bis(hydroxymethyl)chloromethyl)-2-oxazoline, mixtures thereof and the like.

The chain extenders empolyed in the present invention are readily prepared by methods described in "OXAZOLINES, THEIR PREPARATION, REACTIONS, AND APPLICATIONS", John A. Frump, CHEM. REV. 1971, Vol. 71, No. 5, p. 483 and in U.S. Pat. No. 3,466,309.

The crosslinkers, curing agents or chain extenders are particularly useful in the preparation of polyurethane elastomers and flexible foams, particularly flexible high resiliency foams. The polyurethane elastomers and flexible foams can be prepared empolying polyisocyanates and either polyether polyols or polyester polyols or mixtures thereof. Such elastomers are well known and are described in SOLID POLYURETHANE ELASTOMERS, P. Wright and A. P. C. Cumming, Maclaren and Sons, 1969, and POLYURETHANES: CHEMISTRY AND TECHNOLOGY, VOLUMES I AND II, Saunders and Frisch, Interscience, 1962 and 1964. The flexible polyurethane foams are fully described in the two volume publication by Saunders and Frisch, Ibid. Each of the aforementioned publications are incorporated herein by reference.

The quantity of oxazoline to be employed depends, of course, upon the desired degree of crosslinking, chain extension or curing; however the quantity is usually from about 1 part to about 25 parts and preferably from about 5 parts to about 16 parts by weight per 100 parts by weight of the combined weight of the polyol and polyisocyanate components.

As is well known in the art, the polyurethanes may contain fillers, coloring agents, fire retardant agents, catalysts and the like.

The following examples are illustrative of the present invention and are not to be construed as to limiting the scope of the invention in any manner.

EXAMPLE 1

A mixture was prepared from the following components 10 pbw* of a reactive product of glycerine with propylene oxide having an OH equivalent weight of about 87

10 pbw of the reaction product of glycerine with propylene oxide end-capped with about 13–15 weight percent ethylene oxide, the resultant polyol having an OH equivalent weight of about 1650.

10 pbw of a polyoxypropyleneglycol having an average OH equivalent weight of about 1000.

9 pbw of 2-(1,1-bis(hydroxy methyl)ethyl-2-oxazoline) hereinafter BHMEO.

*pbw - parts by weight

The above was stirred to obtain a homogenous mixture, to which 21.3 pbw of toluene diisocyanate (80/20 mixture of 2,4-/2,6-) was added with stirring. Stirring was continued until blending was complete. In 8–9 minutes the resultant polymer was set up. This material was then placed in a press at 100° C and 22,000 psi for 10 minutes. The result was a transparent molding of the urethane elastomer.

COMPARATIVE EXPERIMENT A

A control was prepared as in Example 1 substituting propylene glycol in an amount equivalent in hydroxyl content to the BHMEO used. The rest of the mixture remained the same as in the previous formulation. A urethane elastomer molding was prepared as before.

The samples from Example 1 and Comparative Experiment A were subjected to room temperature and 150° F flexural modulus testing. The following data was obtained using ASTM D-790-66.

| Flex Modulus, psi (kg/cm²) | RT | 150° F |
| --- | --- | --- |
| Example 1 | 25,000 (1757.5) | 12,500 (878.75) |
| Comp. Exp. A | 29,000 (2038.7) | 2,700 (189.81) |

| Flex Strength, psi (kg/cm²) | RT | 150° F |
| --- | --- | --- |
| Example 1 | 1,100 (77.33) | 600 (42.18) |
| Comp. Exp. A | 1,000 (70.3) | 50 ( 3.52) |

We claim:

1. In a polyurethane prepared from polyols and polyisocyanates the improvement comprising employing as a crosslinker, chain extender or curing agent therefore an oxazoline or mixture of oxazolines represented by the formula

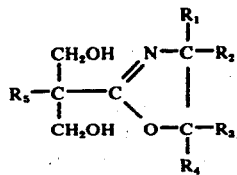

wherein each $R_1$, $R_2$, $R_3$, $R_4$ and $R_5$ are independently selected from the group consisting of hydrogen and hydrocarbon or halohydrocarbon radicals having from 1 to about 6 carbon atoms.

2. The polyurethane of claim 1 wherein the oxazoline is present in quantities of from about 1 to about 25 parts per 100 parts by weight of the combined weight of the polyol and polyisocyanate components.

3. The polyurethane of claim 2 wherein the oxazoline is present in quantities of from about 5 to about 16 parts by weight.

4. The polyurethane of claim 3 wherein the oxazoline is represented by the formula wherein $R_1$, $R_2$, $R_3$ and $R_4$ are hydrogen and $R_5$ is a methyl group.

5. In a process for preparing polyurethanes from polyols, polyisocyanates and either crosslinkers, curing agents or chain extenders, the improvement comprising the step of empolying as said crosslinker, curing agent or chain extender an oxazoline or mixture of oxazolines represented by the formula

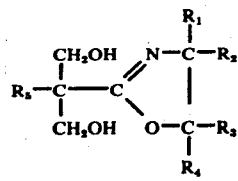

wherein each $R_1$, $R_2$, $R_3$, $R_4$ and $R_5$ are independently selected from hydrogen and hydrocarbon or halohydrocarbon radicals having from the group consisting of 1 to about 6 carbon atoms.

6. The process of claim 5 wherein the oxazoline is present in quantities of from about 1 to about 25 parts per 100 parts by weight of the combined weight of the polyol and polyisocyanate components.

7. The process of claim 6 wherein the oxazoline is present in quantities of from about 5 to about 16 parts by weight.

8. The process of claim 7 wherein the oxazoline is represented by the formula wherein $R_1$, $R_2$, $R_3$ and $R_4$ are hydrogen and $R_5$ is a methyl group.

* * * * *